(12) United States Patent
Cahalan et al.

(10) Patent No.: US 12,529,636 B2
(45) Date of Patent: Jan. 20, 2026

(54) FLOW BASED BIOLOGICAL TESTING PLATFORM AND NONCIRCULAR FLUID TEST LOOPS THEREFOR

(71) Applicant: Ension, Inc., Butler, PA (US)

(72) Inventors: Linda Cahalan, Fort Myers, FL (US); Patrick Cahalan, Fort Myers, FL (US); Michael Hegy, Fort Myers, FL (US)

(73) Assignee: ENSION INC., Butler, PA (US)

( * ) Notice: Subject to any disclaimer, the term of this patent is extended or adjusted under 35 U.S.C. 154(b) by 963 days.

(21) Appl. No.: 17/451,315

(22) Filed: Oct. 18, 2021

(65) Prior Publication Data

US 2022/0196532 A1     Jun. 23, 2022

Related U.S. Application Data

(60) Provisional application No. 63/126,950, filed on Dec. 17, 2020.

(51) Int. Cl.

| | |
|---|---|
| *B01L 3/00* | (2006.01) |
| *G01N 11/04* | (2006.01) |
| *G01N 33/86* | (2006.01) |
| *G01N 35/00* | (2006.01) |

(52) U.S. Cl.
CPC ............. *G01N 11/04* (2013.01); *B01L 3/502* (2013.01); *B01L 3/508* (2013.01); *G01N 33/86* (2013.01); *G01N 2035/00524* (2013.01)

(58) Field of Classification Search
CPC ............................. B01L 3/50; B01L 3/502738
See application file for complete search history.

(56) References Cited

U.S. PATENT DOCUMENTS

| | | |
|---|---|---|
| 5,271,898 A | 12/1993 | Wolf et al. |
| 6,889,539 B2 | 5/2005 | Edelman et al. |
| 7,326,564 B2 | 2/2008 | Lundell et al. |
| 7,837,653 B2 * | 11/2010 | Kriesel ............ A61M 5/16813 604/207 |

* cited by examiner

*Primary Examiner* — Natalia Levkovich
(74) *Attorney, Agent, or Firm* — Blynn L. Shideler; Krisanne Shideler; .BLK Law Group

(57) ABSTRACT

A flow-based biological testing platform comprises a stationary base; a reciprocating base mounted on the stationary base, configured for reciprocating motion on the base; and at least one flexible tubular test loop coupled to both the stationary and the reciprocating base, wherein each test loop is configured to be selectively filled with a biologic fluid, and wherein each test loop includes at least one check valve mounted within the test loop allowing flow in a single flow direction within the test loop, and a fluid loading and removal system attached to the stationary base allowing fluid to be supplied to and withdrawn from the flexible tubular test loop; wherein reciprocation of the reciprocating base induces fluid flow in a single direction within each flexible test loop.

13 Claims, 7 Drawing Sheets

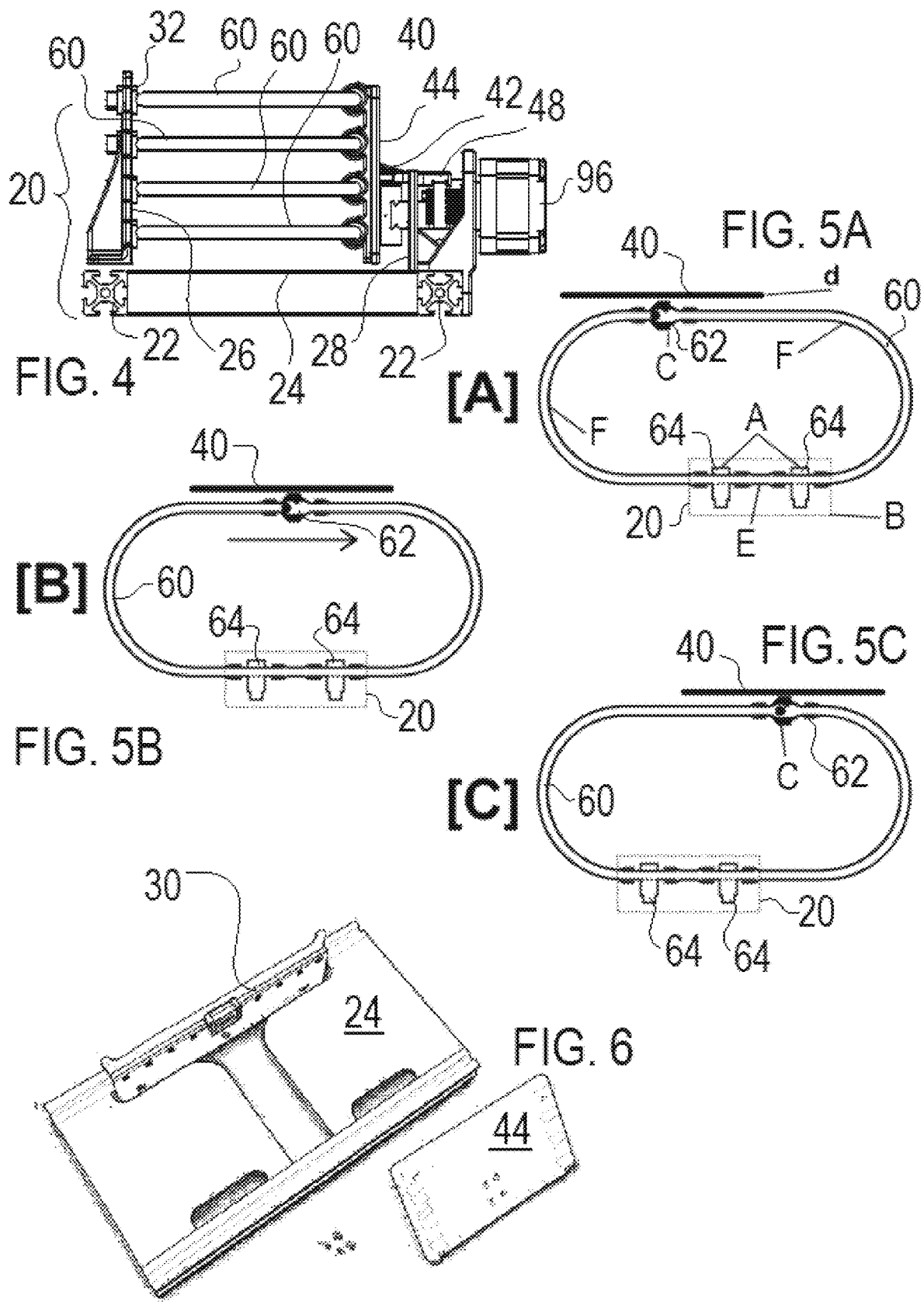

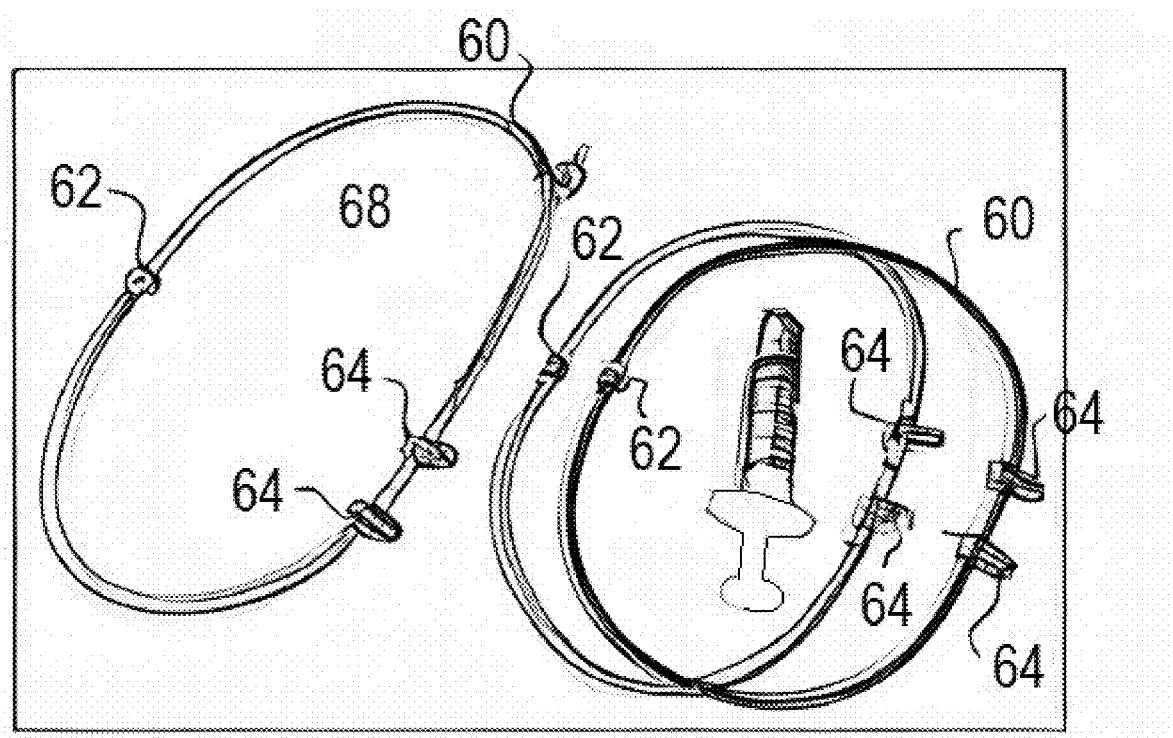
FIG. 9C
FIG. 9D
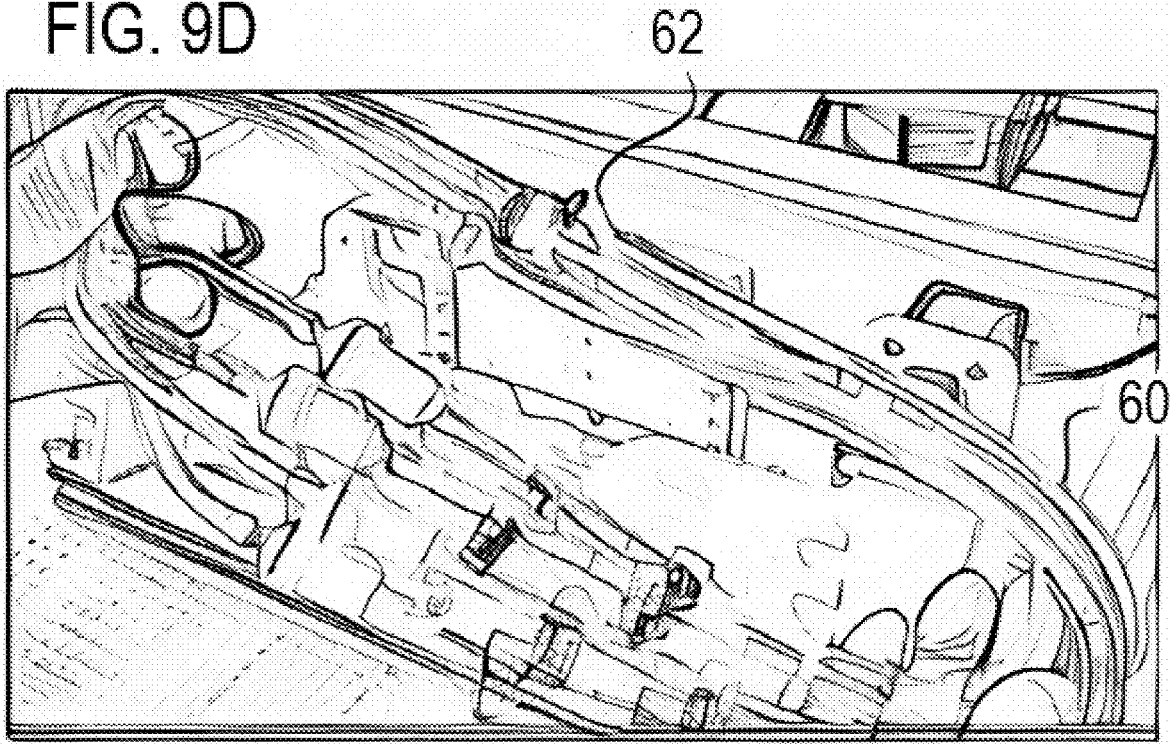

| TEST CATEGORY | TEST |
|---|---|
| THROMBOSIS | GROSS ANALYSIS, LIGHT MICROSCOPY, SFM |
| COAGULATION | THROMBIN (TAT), FIBRIN (FPA), AND PTT CLOTTING TEST |
| PLATELETS | PLATELET COUNTS, PLATELET GRANULE RELEASE PRODUCTS (bTG AND PF4 |
| HEMATOLOGY | HEMOLYSIS AND BASIC BLOOD CONTROLS (COULTER ANALYSIS) |
| COMPLETEMENT SYSTEM | C3a, SC5b9 (QUIDEL CORP) |

FLOW BASED BIOLOGICAL TESTING PLATFORM AND NONCIRCULAR FLUID TEST LOOPS THEREFOR

CROSS REFERENCE TO RELATED APPLICATIONS

This application claims the benefit of U.S. provisional patent application Ser. No. 63/126,950, filed Dec. 17, 2020 titled "Flow Based Biological Testing Platform and Noncircular Fluid Test Loops Therefor" which application is incorporated herein by reference.

STATEMENT REGARDING FEDERALLY SPONSORED RESEARCH

This invention was made, in part, with government support under grant number R44-HL131338 awarded by National Institute of Health (NIH). The government may have certain rights in the invention.

BACKGROUND OF THE INVENTION

1. Field of the Invention

This invention generally relates to a flow-based biological testing platform, and more particularly to biologic fluid testing loop platforms.

2. Background Information

When designing and/or manufacturing medical devices that contact a patient's body fluids and/or tissues, it is desirable to utilize a testing system that can simulate physiological conditions. The features of a particular testing system generally depend on the particular objectives of the desired evaluation. However, the testing system preferably simulates certain physiological conditions to provide mechanical and/or biological features of interest.

Biocompatibility is a major issue in the ability to use prosthetic implants in clinical settings. For example, it is noted that one such set of applications includes vascular prosthesis, such as endo-luminal stents or grafts, to allow blood to flow either through or past a previously blocked vascular segment. A variety of biological consequences ensue when such a foreign structures or materials comes into contact with tissues including blood. These reactions include thrombosis, inflammation, or stenosis and can result in short or long term device failure. Not only is inflammation and subsequent thrombosis responsible for the complications such as acute thrombotic events, but sub-clinical levels have also been implicated in the pathophysiology of restenosis through the release of chemical mediators and through the provision of a scaffold for the ingrowth of migrating and proliferating cells. Vascular patency, as an illustrative example, relies on a careful balance of chemical mediators and local fluid dynamics. With vascular injury, even as simple as the insertion of a small intravascular wire, micro-environmental changes ensue, altering blood flow and the blood's ability to coagulate (or "coagulability"). Physiologically, these cellular and molecular systems interact in a highly inter-dependent manner to make thrombosis possible in the face of arterial flow conditions.

One difficulty that has limited the extensive examination of bio-prosthetic thrombosis is the highly flow-dependent nature of thrombosis and lack of widely applicable non-blood or other tissue damaging flow models. Control and documentation of reproducible flows are essential to the study of the dynamically coupled cellular and protein pathways leading to implant thrombosis. Also, doing so in a controllable in vitro setting is desirable as individually and controllably perturbing the various thrombotic components is essential to studying the dynamically coupled cellular, protein, coagulation, and inflammation pathways.

Various prior art flow-based biological testing platforms have been developed in order to study a spectrum of biological processes including inflammation and thrombosis. One such flow-based biological testing platform comprises a loop partially filled with blood on a tilted turntable, leaving an air gap at the top. As the turntable spins, gravity keeps the fluid at the bottom of the tube, creating flow. This flow based biological testing platform is known as a Chandler loop (named after one of the inventors thereof). See Chandler, A. B., 1958, "In vitro thrombotic coagulation of the blood," Laboratory Investigation, 7, pp. 110-114. The loop in the Chandler loop testing platform general serves to contain the blood in a closed system, and the Chandler loop when rotated will result in blood flow largely due to the air space, as without this airspace the blood would be rather stagnant and could separate into phases. The airspace and associated air-blood interface presents an air-blood interaction causing activation and creating a significant departure from the physiological situation.

U.S. Pat. No. 5,271,898, which is incorporated herein by reference, discloses a flow-based biological testing platform which includes a stepper-motor driven circular disc upon which a test loop is mounted, wherein the test loop is a circular, closed loop of polymer tubing containing a check valve and contains either the test materials, coating, or device. The apparatus generates pulsatile movement of the test vehicle. Oscillation of the test vehicle results in the pulsatile movement of fluid over its surface. This flow based biological testing platform is known as the Wolf loop (also named after one of the inventors thereof). The blood in the Wolf loop platform is moved forward by inertia and is prevented from backward flow by at least one check valve. The use of a check valve removes the need for a roller pump which causes significant hemolytic damage to cells and hence activation. The Wolf loop platform requires that the whole loop to be moving during operation requiring the platform to be stopped to take samples which can unduly limit operation of the platform.

U.S. Pat. No. 6,889,539, which is incorporated herein by reference, discloses a flow-based biological testing platform for accurately creating fluid flow. The platform comprises at least one fluid filled loop and a rotor stage for maintaining at least one rotor, wherein each loop is positioned on the rotor. The platform also includes a driving motor for rotating the rotor stage and a motion controller for controlling the speed and directional motion of the motor.

U.S. Pat. No. 7,326,564, which is incorporated herein by reference, discloses a flow-based biological testing platform which includes a medical device mount, fluid and a conduit containing the fluid and medical device mount. The conduit is mounted on an assembly that moves the conduit along with the medical device mount to induce relative motion of the fluid relative to the medical device mount.

In vitro test systems such as flow-based biological testing platforms need to operate in such a way as to assure reasonable simulation of physiological conditions. This also means that the blood contacting surface of the system should not generate activated molecular and cellular species that can affect or injure downstream tissues and organs. Similarly, aberrations to composition and the flow of the blood should be avoided.

The need for consistent measurements in flow-based biologic testing platforms conforms with and supports US Food and Drug Administration (FDA) guidelines and goals. The FDA announced a new Medical Device Development Tools (MDDT) program in 2017. The FDA announced that the MDDT is a "way for the FDA to qualify tools that medical device sponsors can use in the development and evaluation of medical devices." Qualification by the FDA within this MDDT means that the FDA has evaluated the tool and concurs with available supporting evidence that the tool produces scientifically-plausible measurements and works as intended within the specified context of use.

There remains a need for a flow based biologic testing platform that allows researchers and manufacturers to more accurately, comprehensively, and economically evaluate the biocompatibility of drugs, material substrates, and finished medical products in vitro.

SUMMARY OF THE INVENTION

The various embodiments and examples of the present invention as presented herein are understood to be illustrative of the present invention and not restrictive thereof and are non-limiting with respect to the scope of the invention.

One aspect of the invention provides a flow-based biological testing platform comprising a stationary base; a reciprocating base mounted on the stationary base, configured for reciprocating motion on the base; and at least one flexible tubular test loop coupled to both the stationary and the reciprocating base, wherein each test loop is configured to be selectively filled with a biologic fluid, wherein each test loop includes at least one check valve mounted within the test loop allowing flow in a single flow direction within the test loop, and a fluid loading and removal system attached to the stationary base allowing fluid to be supplied to and withdrawn from the flexible tubular test loop; wherein reciprocation of the reciprocating base induces fluid flow in a single direction within each flexible test loop.

The flow-based biological testing platform according to the invention is configures to minimize background noise by, in part, minimizing the variance of the measured activated species. Specifically, the interior of the fluid test loop has a coefficient of variance of less than 15%.

The flow-based biological testing platform according to one aspect of the invention provides that the stationary base includes a linear slide supporting the reciprocating base for linear reciprocating motion on the base, and further including a stepper motor driving the reciprocating base for linear reciprocating motion on the base.

The flow-based biological testing platform according to one aspect of the invention provides that the fluid loading and removal system of each flexible tubular test loop comprises a pair of access ports separated by a tubular portion.

The flow-based biological testing platform according to one aspect of the invention provides that each test loop includes a single check valve mounted within the test loop formed as a ball check valve which includes a seat housing forming the seat for the valve and a chamber housing threaded thereto with a ball contained therebetween.

The flow-based biological testing platform according one aspect of the invention includes a plurality of flexible tubular test loops are coupled to both the stationary and the reciprocating base and are configured for simultaneous operation. Further, the reciprocating base is configured for asymmetric reciprocating motion, and wherein each flexible test loop forms an oval shape in top or plan view and reciprocation of the reciprocating base induces pulsatile fluid flow in within each flexible test loop. The flow based biological testing platform according to one aspect of the invention provides that each flexible test loop snaps into the stationary and the reciprocating base.

One aspect of the invention provides a noncircular flexible tubular test loop configured to be simultaneously coupled to a stationary and a reciprocating base of a biologic testing platform wherein each test loop includes at least one check valve mounted within the test loop allowing flow in a single flow direction within the test loop, and a fluid loading and removal system attached to the stationary base allowing fluid to be supplied to and withdrawn from the flexible tubular test loop, wherein reciprocation of a portion of the flexible tubular test loop induces fluid flow in a single direction within each flexible test loop.

BRIEF DESCRIPTION OF THE FIGURES

FIG. 4 is a side elevation view of the flow based biological testing platform of FIG. 1.

FIGS. 5A-C are schematic figures illustrating the inducement of blood flow within the flow based biological testing platform of FIG. 1.

FIG. 6 is a partially assembled view of a portion of the stationary base and a separate reciprocating base of the flow based biological testing platform of FIG. 1.

DESCRIPTION OF THE PREFERRED EMBODIMENTS

Figure 1:
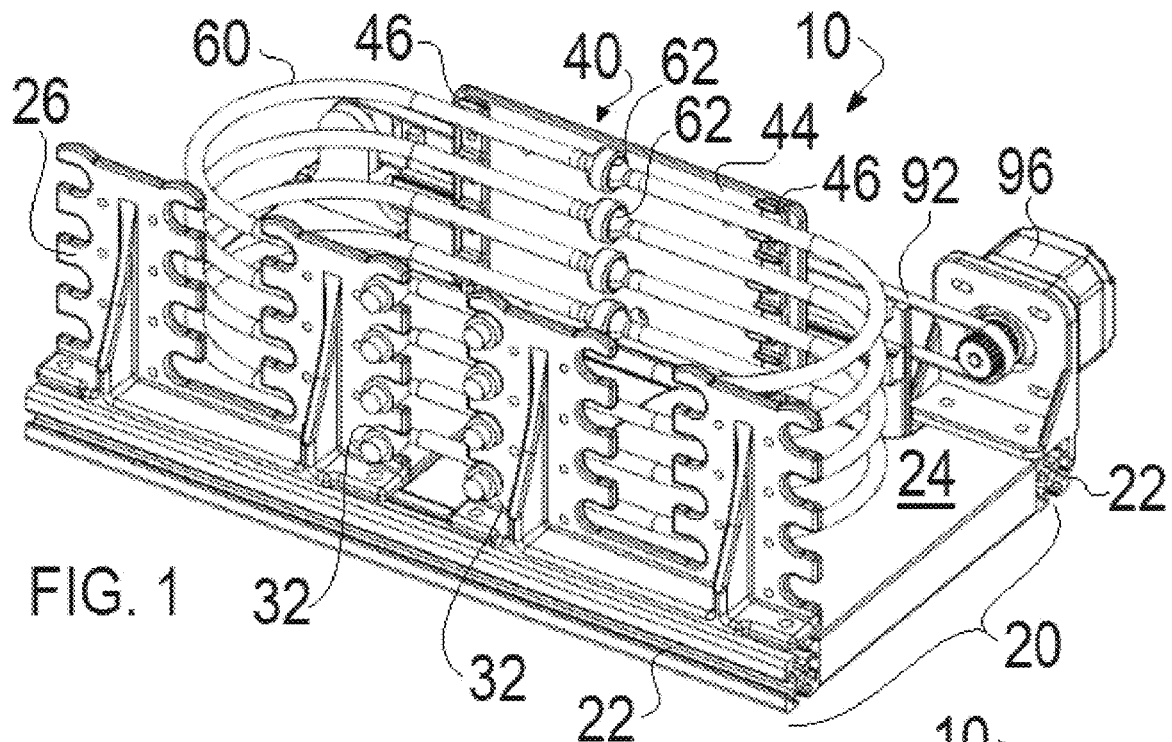
FIG. 1 is a perspective view of a flow based biological testing platform according to one embodiment of the present invention.
Figure 2:
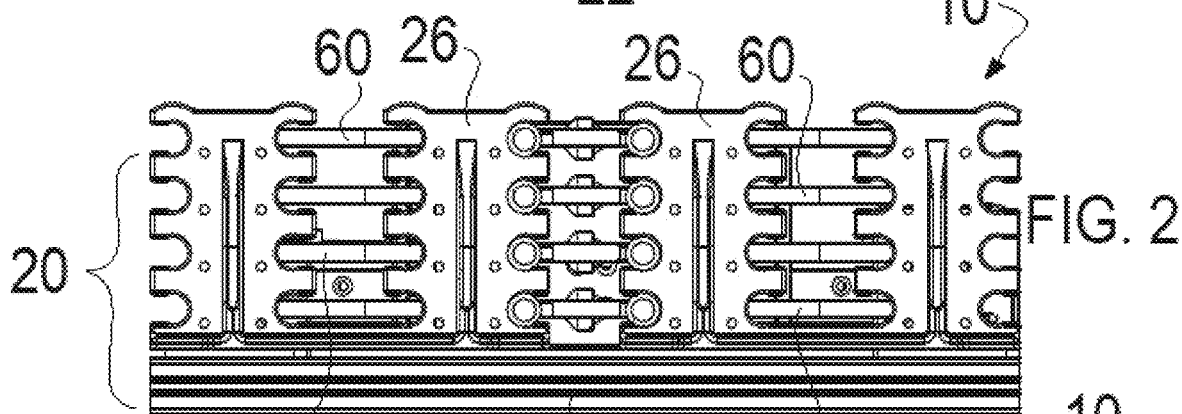
FIG. 2 is a front elevation view of the flow based biological testing platform of FIG. 1.
Figure 3:
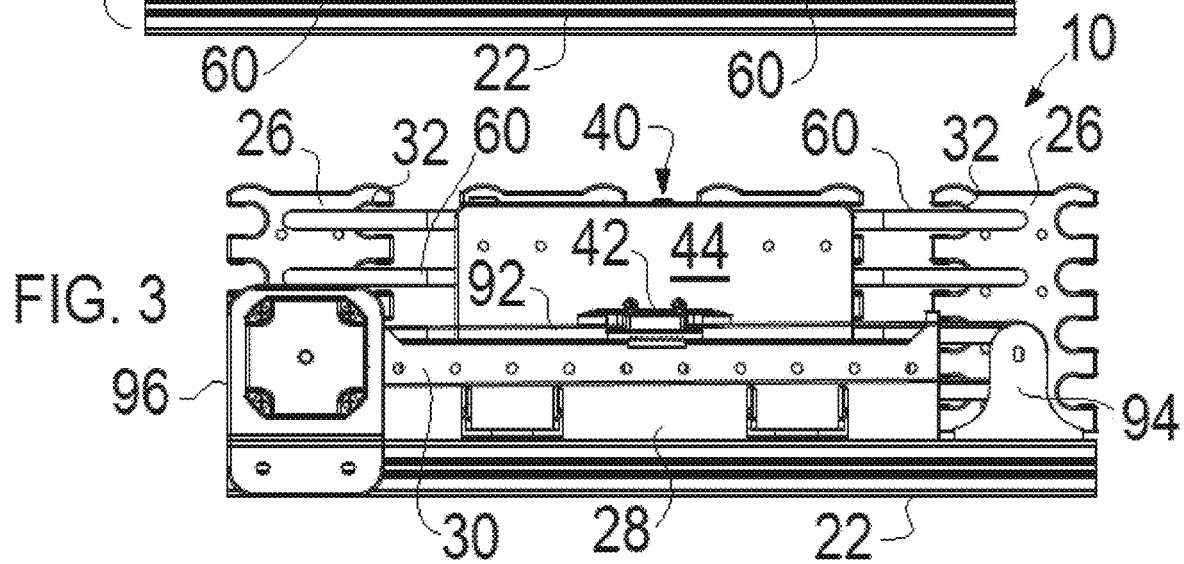
FIG. 3 is a rear elevation view of the flow based biological testing platform of FIG. 1.

The present invention provides a flow-based biological testing platform 10 or system 10 best shown in FIGS. 1-4. The platform includes a stationary base 20; a reciprocating base 40 mounted on the stationary base, configured for reciprocating motion on the base 20; and a least one flexible tubular test loop 60 coupled to both the stationary base 20 and the reciprocating base 40, wherein each test loop 60 is configured to be selectively filled with a biologic fluid, and wherein each test loop 60 includes at least one check valve 62 mounted within the test loop 60 allowing flow in a single flow direction within the test loop 60, and a fluid loading and removal system (ports 64) attached to the stationary base 20 allowing fluid to be supplied to and withdrawn from the flexible tubular test loop 60; wherein reciprocation of the reciprocating base induces fluid flow in a single direction within each flexible test loop 60.

FIGS. 5A-C are schematic figures illustrating the inducement of blood flow within the flow based biological testing platform 10 of the present invention. The platform 10 of the present invention will have the test loops 60 mounted and filled with biologic fluid, such as typically blood. The platform 10 starts in a resting position [FIG. 5A]. The access fittings/fill ports 62 (needless ports in this example but needle ports could also be used) (shown at a) and associated tubing part of the flexible loops 60 (the flexible tubing of which is schematically shown as f of FIG. 5A) are constrained to the stationary base 10 (schematically shown as b in FIGS. 5A-C). The check valve 62 (schematically shown as c) with its associated rubber tubing (schematically shown as fin FIG. 5A) part of the flexible loop 60 and the mobile plate or reciprocating base 40 (shown schematically as din FIG. 5A) rapidly accelerates to the right [FIG. 5B]. During this acceleration, the check valve 62 is closed and the fluid that is being held statically inside the moving portion of the flexible loop 60 accelerates at the same rate. The check-valve 62, associated tubing, and reciprocating base 40 rapidly accelerate to a stop at position shown in FIG. 5C. At this point the inertia carried in the fluid (and the check valve ball) opens the check-valve 62 and permits a net flow clockwise as pictured. Following this, the check-valve 62, tubing of the loops 60, and mobile plate of the base 40 begins to slowly return to the initial position [of FIG. 5A] before the fluid's motion stops due to frictional losses. Net flow rates and individual pulse volume can be adjusted by altering system accelerations and stroke lengths. The flexible tubing of loop 60 allows for this motion of part of the loop being reciprocated while part of the loop is stationary.

The linear reciprocation motion of the reciprocating base 40 of the platform 10 of the present invention avoids the use of a roller pump that has been known to cause significant hemolytic damage to cells and hence activation in some prior art test loops. The linear actuation of the platform 10 of the present invention avoids the introduction of significant centripetal forces into the fluid as is found in the centrifuge type accelerations of the Wolf loop and similar designs. The platform 10 of the present invention is shown with a single check valve 62, namely a ball valve described in detail below. It is possible that more than one check valve 62 is used in each loop 60, but the use of a single valve 62 is preferred as it minimizes hemolytic damage to cells as compared with multiple check valves 62. Thus, the present platform 10 may be categorized as a Reciprocating Single Valve Induced flow pump system, and the platform 10 is sometimes referenced as an RSVI system 10 herein.

Stationary Base 20

The stationary base 20, which may also be called a housing, is efficiently formed between two mounting rails 22 at the front and rear of the stationary base with floor plates 24 extending there-between. A linear rail 30 supporting a sliding carriage 42, best shown in FIG. 6, is mounted and centered on a rear vertical plate 28. The linear rail and carriage define the movement of the reciprocating base 40.

The front of the stationary housing or base 20 includes a front vertical panel member 26 that includes snap fit connections 32 for the fluid loading and removal system (e.g., access ports 64 in the form of needless ports) and connections 32 for the tubing of a plurality of independent flexible loops 60. Specifically, the platform 10 as shown can quickly and independently received four disposable flexible loops 60. The snap fit connections 32 to the stationary housing or base 20 allows each test loop 60 to be easily installed and removed as desired. The snap fit connections 32 for the access ports 64 of the test loops 60 are semicircular openings in the vertical panel member 26 sized to match and couple to the access ports 64 of the test loops 60.

The snap fit connections 32 for the tubing of the test loops 60 are clip members formed as opposed "fingers" on the vertical panel member 26 sized to match and couple to the tubing of the test loops 60. The snap fit connections 32 for the tubing may effectively be formed by vertical tubing connection strips attached to the vertical panel member 26 and each including four tubing clip members sized to receive the tubing in a snap fit arrangement. Forming the vertical tubing connection strips as separate members attached to the vertical panel member can simplify construction as the same members can be used in the reciprocating base as discussed below. Further, optionally, independent vertical tubing connection strips can be attached to the tubing of the test loops 60 between the front panel member 26 of the stationary base 20 and the reciprocating base 40 to act as stabilizers or spacers for the test loops 60 during operation, with such stabilizers placed on the loops at apex of the ovals (the lateral ends) and not connected to either the stationary base 20 or the reciprocating base 40 (aka free floating spacers).

Figure 10A:
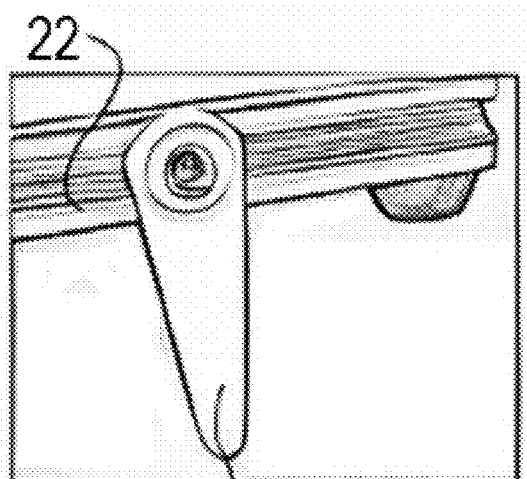
FIGS. 10A and 10B are perspective views of an optional kickstand for use with the flow-based biological testing platform of FIG. 1.
Figure 10B:
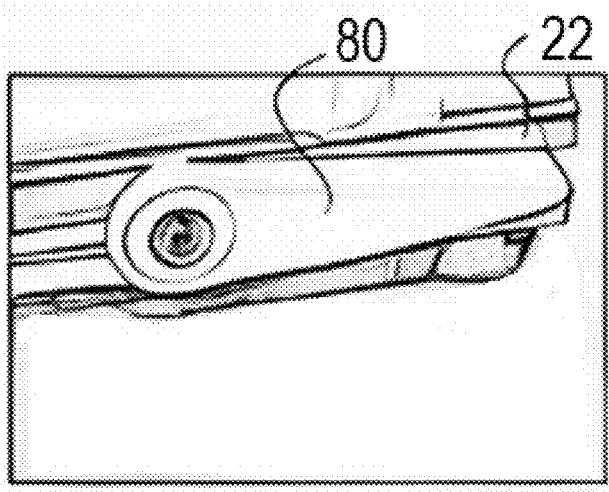

It has been found that when loading the loops 60 (filling them with desired fluids) of the platform 10 of the present invention, elevating the front of the stationary base yields improved access. FIGS. 10A and 10B are perspective views of an optional pivoting kickstand 80 coupled to front rail 22 for use with the flow based biological testing platform 10 of the invention to yield a selective elevation, when desired. The elevated position provided by the kickstand 80 also helps mitigate the inclusion of air into the loops 60 when filling with blood and/or saline or other fluid of interest.

Reciprocating Base 40

A reciprocating base 40 is mounted on the stationary base 20 and is configured for reciprocating linear motion on the base 20 to provide the induced flow as discussed above. Specifically, a vertical reciprocating base plate 44 is attached to the movable carriage 42 of the linear slide. The vertical reciprocating base plate will include the snap fit couplings 46 for attaching a portion of each loop 60 thereto, specifically the portion of each loop 60 including the check valve 62. The snap fit couplings 46 for attaching a portion of each loop 60 will use a pair of vertical tubing connection strips attached to the vertical reciprocating base plate 44.

Figure 7:
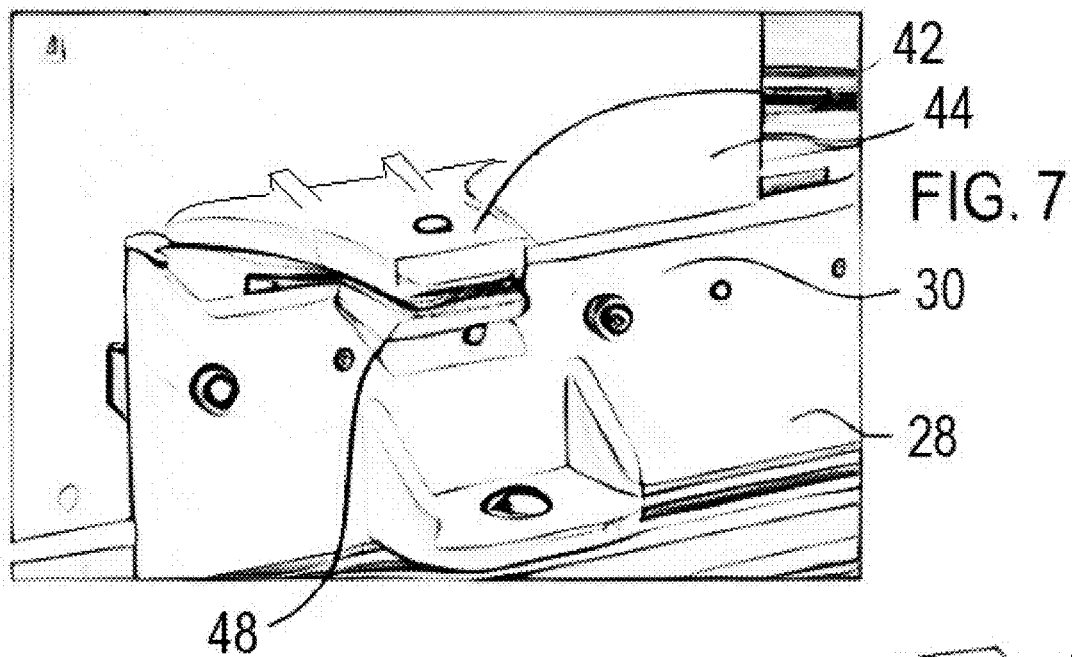
FIG. 7 is an enlarged partially assembled view of a belt clamp of the reciprocating base of the flow-based biological testing platform of FIG. 1.
Figure 8:
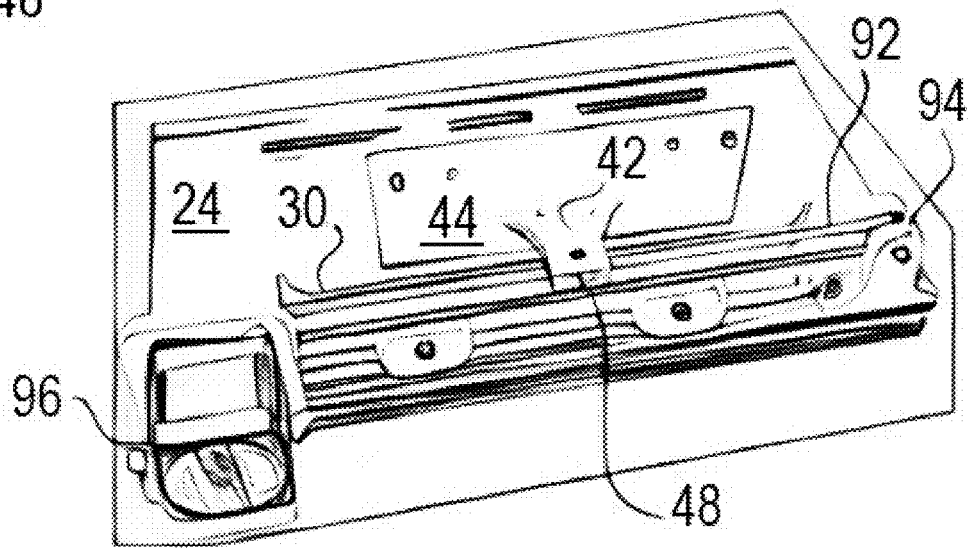
FIG. 8 is a partially assembled view of a portion of the stationary base and a separate reciprocating base of the flow-based biological testing platform of FIG. 1.

The carriage 42 of the reciprocating base includes a belt clamp 48 as detailed in FIG. 7 for attachment to an associated drive belt 92 as shown in FIG. 8 which is a partially assembled view of a portion of the stationary base 20.

A stepper motor 96 is mounted to the stationary base 20 together with a spaced idler pulley 94. The drive belt 92 is reeved around the output of the stepper motor 96 and the idler pulley 94 and the stepper motor 96 drives the dive belt 92 which in turn drives the reciprocating base 40 for linear reciprocating motion on the stationary base 20. The idler pulley 94 may be adjusted on the rail 22 to adjust the tension in the drive belt 92.

Figure 11A:
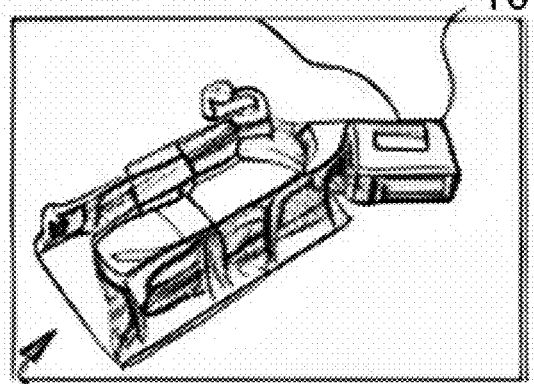
FIGS. 11A and 11B are perspective views of the flow-based biological testing platform of FIG. 1 with reciprocating drive, PLC controller and multiple loop test loops loaded and the platform within a temperature control chamber, respectively.
Figure 11B:
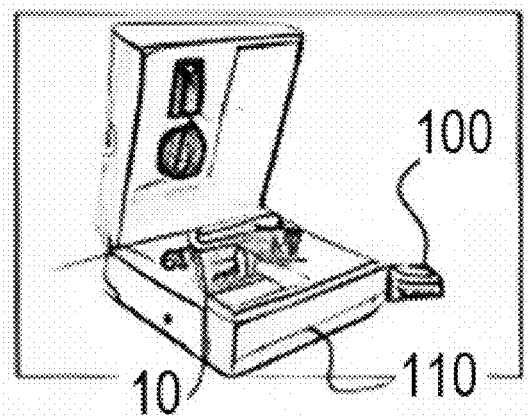
Figure 12:
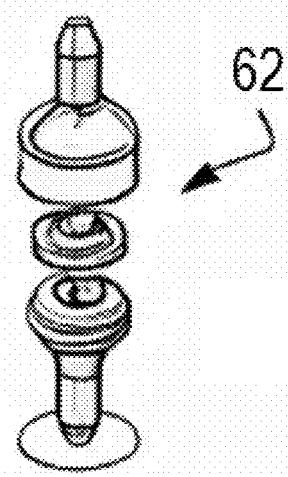
FIG. 12 is an exploded view of a purposefully designed, disposable ball valve used in each test loop of the flow-based biological testing platform of FIG. 1.

The stepper motor 96, drive belt 92 and the linear slide 30 with the reciprocating base 40 attached forms a reciprocating drive for the system 10 with the motor controlled by a programmable logic controller 100 (PLC) shown in FIGS. 11A and 11B. The speed, acceleration, and length of stroke of the reciprocating base will be controlled by the PLC controller 100, having suitable controls for operating the aspects of the system 10, including recording, displaying, transmitting the operational aspects of the system 10. As discussed above, the platform or system 10 accommodates asynchronous reciprocating movement, meaning the movement profile (velocity, acceleration) may differ in one direction than the other. It is considered that the general profile will be rapid acceleration in the flow direction with a slow return to the start position for the next "pulse" or "impulse" motion. This asynchronous motion is believed to be preferred but is not required to create the pulsatile flow of the platform 10 as the check valve 62 operation with the reciprocating base 40 will yield a pulse type fluid response even in synchronous motion of the reciprocating base 40.

Temperature Control

The compact platform 10 of the present invention can easily fit within a temperature control chamber 110 or incubator as shown in FIG. 11B, which may have a separate temperature control unit. The incubator and associated temperature control unit will also be controlled by the controller for the platform.

Flexible Test Loops 60

Each flexible test loop 60 of the invention is formed by a flexible medical grade or other specific tubing formulation and preferably a single check valve 62 mounted within the test loop 60 allowing flow in a single flow direction within the test loop 60. The tubing forms attachment points to secure the loops 60 to the stationary base 20 and the reciprocating base 40 as noted above. The tubing may also serve as attachment points for optical sensors that may be desired, such as flow sensors or such as pulse oximeter sensors (which can achieve measurements based upon the pulsatile flow, although the signal processing for conventional pulse oximeters may not accommodate the operational parameters of the platform 10—in other words the sensor would work in theory but filters or other processing of signals may lose the signal of interest in the platform due to operational conditions being outside the processing range for results—thus the sensors must be reprogrammed to accommodate operational parameters of the system 10.)

The check valve 62 is shown in detail in FIG. 10 and is a ball check valve which includes a rigid seat housing forming the seat for the valve and a rigid chamber housing threaded thereto and a sealing gasket with a ball contained there-between. The rigid seat housing and chamber housing include a coupling end for attaching to the flexible tubing. Forming the ball check valve 62 with rigid housing members improves over the check valve in the known Wolf loop designs by assuring a consistent seal with the seat and non-interference in the chamber portion (i.e., the ball does not seal against the upper chamber. Using tubing to form the seat and/or the chamber portion of the ball valve can lead to inconsistent results in operation and change the operational flow conditions. The use of the rigid housing members does increase the dissimilar materials in the test loops 60 of the invention and this is one reason for the use of surface treatment as discussed below.

Each test loop 50 includes a fluid loading and removal system which is snap fit into the stationary base 20 as discussed above. The fluid loading and removal system allows test fluid, such as blood and blood products, to be supplied to and withdrawn from the flexible tubular test loop 60. The fluid loading and removal system comprises a pair of access ports 64 such as but not limited to needless access ports that are separated by a tubular portion (schematically shown as e in FIG. 5A)

Figure 9A:
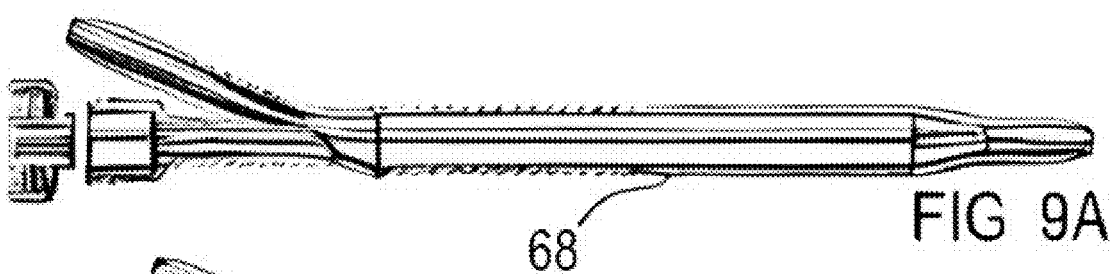
FIGS. 9A and B are sectional views of one test chamber arrangement for the flexible test loops of the flow-based biological testing platform of FIG. 1.
Figure 9B:
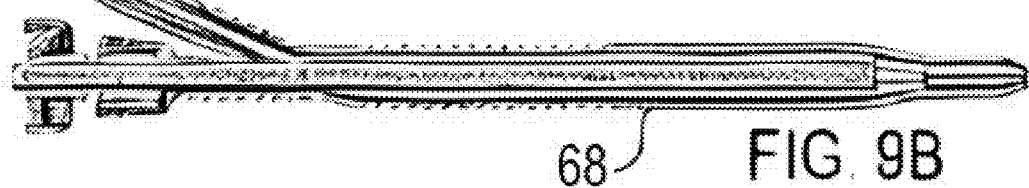
FIG. 9C is a perspective one flexible test loops implementing the test chamber of FIGS. 9A and 9B and two test loops without test chambers, each illustrated test loop being used in the flow-based biological testing platform of FIG. 1.
FIG. 9D is a perspective view of flexible test loops of the flow based biological testing platform of FIG. 1 having alternative test chambers.

Each test loop 60 may or may not include a test chamber. For example, if the platform 10 is testing blood interaction with a medicament introduced into the blood then there will be no need for a separate test chamber. FIGS. 9A and 9B are sectional views of one test chamber 68 arrangement for the flexible test loops 60 of the flow based biological testing platform of FIG. 1, namely a rear loading catheter test chamber 68. FIG. 9B shows the ease of loading this test chamber 68. The chamber 68 geometry permits acute angle entry of test catheters while avoiding or minimizing turbulence. The test chamber 68 design includes a seal to prevent flow of blood into the interface of the test chamber and the insertion guide. FIG. 9C is a perspective one flexible test loops implementing the test chamber of FIGS. 9A and 9B and two test loops without test chambers to illustrate alterative designs. FIG. 9D is a perspective view of flexible test loops 60 of the flow based biological testing platform of FIG. 1 having alternative test chambers 68.

Each test chamber 68 will include opposed tubing couplings, as shown, so that the test chamber 68 can be easily coupled to the tubing of the loop 60. The particular test chambers 68 can be designed to accommodate the particular substrate being tested to properly hold the substrate in the flow path for testing and to facilitate loading and unloading of the chamber 68. The two illustrated examples of chambers 68 are merely representative of the testing chambers 68 that are possible, but these two illustrated examples would accommodate a large variety of substrates to be tested.

The test loops 60 of the platform 10 are intended to be of a simple design to better accommodate a disposable use for these elements. It may be possible to sterilize and reuse the test loops 60 but it is preferred that the loops 60 be disposable to avoid cross contamination and possible influence of test results.

Background Noise Reduction

The flow-based biological testing platform 10 according to the invention is configured to minimize background noise by, in part, minimizing the variance of the measured activated species. Specifically, the interior of the fluid test loop 60 has a coefficient of variance of less than 15% of the measured activated species. The flow-based biological testing platform 10 according to the invention is configured to minimize background noise by, in part, minimizing the effect of the system surface on the blood. The preferred structure is to employ a surface treatment of an engineered heparin bioactive matrix onto all the surfaces within the platform, resulting in a covalently bonded heparin surface throughout the blood contacting portion of the system 10. The surface treatment outlined in U.S. Patent Publication 2021/0100935 and in WO 2019/203898, which are incorporated herein by reference, are suitable for the present platform and yields a bioactivity level of 0.6+/−0.2 IIa deactivation/cm$^2$.

The details of a preferred treatment are set forth in U.S. Patent Publication 2021/0100935 and in WO 2019/203898, however a summary of the essential steps include activating the blood contacting surface of the platform, namely each flexible tubular test loop 60, via, for example, gas activation; performing wet chemistry treatments on each flexible tubular test loop 60 which the follows a blood or fluid flow path there-through including i) enhancing the blood contacting surface on each flexible tubular test loop 60 with a wet chemistry treatment including an aqueous solution having a strong oxidizing agent; ii) adding a positively charged spacer molecule to the blood contacting surface with a wet chemistry treatment including an aqueous solution having a cationic polymer; and iii) covalently immobilizing heparin to the blood contacting surface on each flexible tubular test loop 60 with a wet chemistry treatment including heparin. Thus, the surface of the blood contacting surface of the platform 10, namely each flexible tubular test loop 60, has demonstrated unique minimal activation of cellular elements such as platelets, RBCs, leukocytes, and molecular elements such as complement, thrombin, and numerous other serine proteases in the coagulation cascade.

The ability to covalently immobilize heparin on all the blood contacting surfaces, including those of dis-similar material, is believed to be significant. It is understood that even a relatively small untreated area in the interior blood contacting area of the loop 60 can significantly hinder the ability to obtain statistically significant comparative data with materials or coatings to be tested. The interior of the loops 60, treated as noted above, provides uniform treatment of all blood contacting surfaces even though there are different materials. Thus, assuring minimal background noise, and maximum ability to detect activation on specific sample materials and coating in the systems test chamber.

Figures 14, 15:
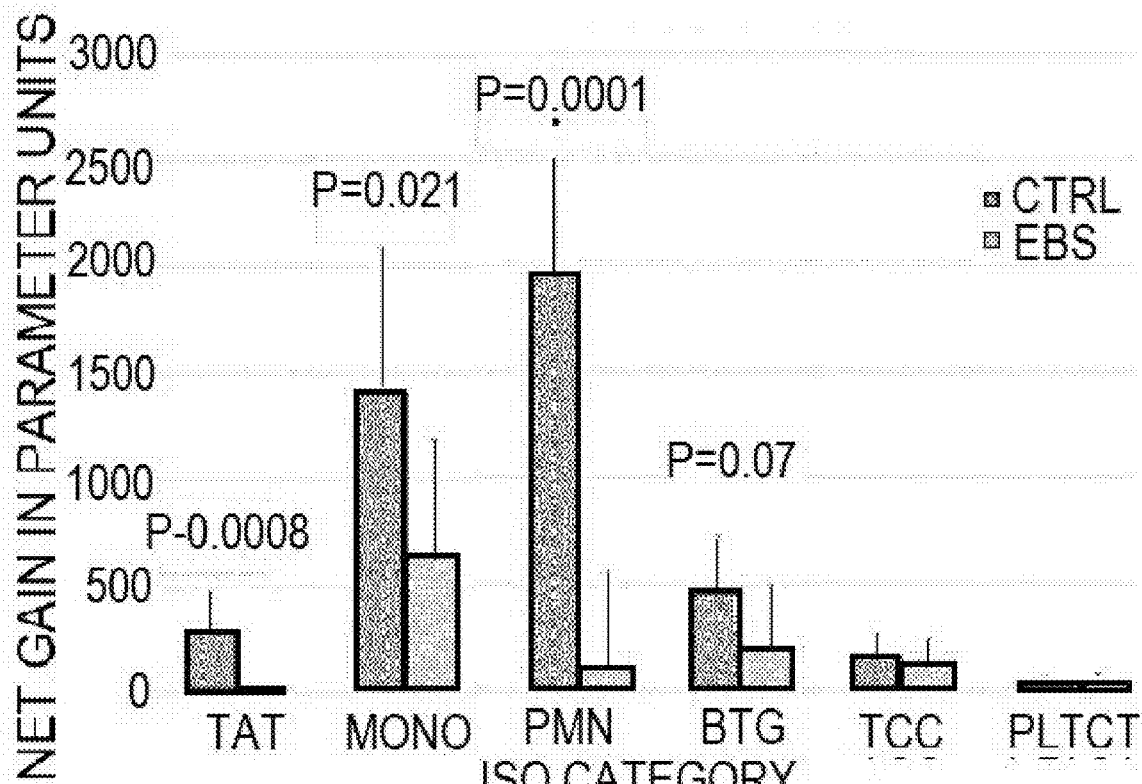
FIG. 14 is a graph of an analysis of systems of the present invention treated to reduce background noise as compared to untreated systems.
FIG. 15 is a chart of the relevant categories of ISO 10993-4, circa 2017, which specifies general requirements for evaluating the interactions of medical devices with blood and useful in evaluating the system of the present invention.

That platform 10 of the invention was evaluated in human blood to characterize the confidence interval of the responses of the five ISO 10993 categories used to evaluate blood-biomaterial interactions as a function of controlled flow, systemic heparin, and surface bioactivity. This testing was performed on untreated (control) platforms of the invention and surface-treated platforms (Referenced as EBS—yielding a bioactivity level of 0.6+/−0.2 IIa deactivation/cm$^2$ on the blood contacting areas of the test loop interiors). Statistical analysis of untreated versus treated systems performance demonstrated large decreases in coagulation and inflammation with the coated circuit. These results are represented in the chart forming FIG. 14.

Operation

An approximate outline of the basic loop 60 loading and filling process is as follows, but the specifics, of course, may change depending on the experiment or methods, such that this is merely an illustrative illustration. The initial step is to "Power on" the platform pump (motor 96) and incubator (temperature control chamber 110). The reciprocating base 40 finds its home position then parks in the middle. The incubator is possibly already set to 37 C. The pump volume readout is calibrated for a basic 24" loop. It is noted that calibration generally only effects the "mL/min" reading of the pump. A "Left Acceleration" or "L=" reading is absolute and defined only by a potentiometer knob on the pump's control box regardless of calibration.

The next step of general operation is to allow the closed incubator and pump to warm up. The user will then load up to four closed loops 60 into the platform 10, wherein the Needleless ports 64 or fittings (spaced 1.5" apart on each loop 60) snap into the stationary plates or connections 32 of the stationary base 20 and to the connections 46 of the reciprocating base 40 and wherein the loop's single check valve 62 is retained on the reciprocating base 40. Optional "parallel spacers" or stabilizers can be added to the outer radius of the loose tubing to prevent excess movement.

In the platform 10 shown the fluid flow will always be clockwise. The user then loads each loop 60 with warm saline. In order to facilitate this loading, the user can lift and prop-up the front of the platform 10 on the deployed kickstand 80. The user will attach an empty 60 mL "waste" syringe to the right needless port 64 of the loop 60 being loaded and will attach a full 60 mL syringe of warmed (37 C) saline to the left needless port 64. The user can then clamp the center tube between these two ports 64 with a pair of hemostats. The user slowly pulls the "waste" syringe. During this loading, the user will observe the moving head of fluid and agitate or "tilt up" components that may trap air (such as the sample chamber and/or valve). Once all air bubbles have made it to the "waste" syringe the user can remove the center tube clamp. Then the user can slowly continue to pull the "waste" syringe to void any remaining air in this short tube. The user can remove both syringes and repeat for each loop 60.

With the saline loaded in each loop 60 the "Wetting process" can now begin in which the user will retract the kickstand 80, place the platform 10 and close the incubator. The user or operator will press the start on the controller 100 (which is set to desired speed) and start timer. The temperature of the platform 10 typically recovers in under two minutes.

Following the wetting process each loop 60 will be typically loaded with blood. The operator will collect at least 50 mL of blood from donor in a 60 mL syringe and stop the pump. The operator can again lift and prop-up the front of the system 10 on the deployed kickstand 80. Similar to saline loading, the operator will attach an empty 60 mL "waste" syringe to the first right needless port 64 and attach a full 60 mL syringe of blood to the first left needless port 64 and clamp the center tube between these two ports 64 with a pair of hemostats. The operator slowly pulls the "waste" syringe and observe the moving front of blood. If any air is accidently introduced, the user will agitate or "tilt up" components that may trap air (sample chamber or valve). Once pure blood and possible air bubbles have made it to the "waste" syringe (<10 mL), the operator removes the center tube clamp and slowly continues to pull the "waste" syringe to displace any remaining saline solution in this short tube (<2 mL). After loading the operator removes both syringes and moves both syringes to the next loop 60, clamp, and repeat until all are full. Total fill time should be 1-2 minutes. 5-10 mL of blood should be left in the syringe for possible control testing.

After blood loading the user can retract the kickstand 80. Blood testing process can now begin where the operator will close the incubator and press the start button on pump controller 100 (set to desired speed) and start timer. The temperature typically recovers in under two minutes.

The platform 10 allows for sampling of blood out of loops 60 for analytical testing. One option is to sample into open tube/vial, and for this option the loops 60 can be removed or sampled while pump is in motion. For sampling to an open tube or vial the user attaches a 15-60 mL syringe full of air to the left needleless port 64, attaches an open needleless fitting to the right port 64, Clamps the center tube with a pair of hemostats, Positions sampling vessel under the right open needleless fitting or port 64, and depresses the air-filled syringe such that blood will enter the vessel. One option is to sample into small <5 mL syringe, and for this option a 2-5 mL empty syringe is attached to the right port 64 in place of the open needless fitting and the sample syringe is used to pull the sample blood into the sample syringe. A further option is to remove a loop, and slowly and firmly disconnect the tubing on the immediate left-side of the check valve 62 and to position the tubing to let gravity drain the blood into a sampling vessel while lifting the check valve 62 as blood will flow away from the valve 62. Other options also available depending on final sampling methods.

The platform 10 of the present invention allows efficient and effective testing of blood compatibility under flowing conditions in compliance with physiologically relevant in vitro testing criteria for testing materials and blood contacting products. The platform 10 of the present invention addresses many of the current issues with in vitro blood loops and facilitates all facets of the testing and sustain excellence in the highly complex art of blood testing. This platform 10 simplifies evaluations of five categories of ISO 10993-4, wherein the version of ISO 10993-4 from 2017 is referenced herein, which specifies general requirements for evaluating the interactions of medical devices with blood. It describes a) a classification of medical devices that are intended for use in contact with blood, based on the intended use and duration of contact, b) the fundamental principles governing the evaluation of the interaction of devices with blood, c) the rationale for structured selection of tests according to specific categories, together with the principles and scientific basis of these tests. The relevant categories of ISO 10993-4 are detailed in the chart forming FIG. 15.

The platform 10 of the invention provides the ability to evaluate all five categories of ISO 10993-4 simultaneously versus traditional isolated, single variable testing that cannot consider interactions between factors, and the platform can revolutionize in vitro testing. The platform 10 can be used retrospectively to perform blood compatibility testing but, more importantly, prospectively to help medical product developers optimize material selection and better predict in vivo performance.

As discussed above the platform 10 of the present invention only has a portion of the loop 60 moving and allows for immobilized loading and sampling ports 64. The latter with, for example, a double needleless port system facilitates introduction or loading of fluids as well as the removal of air from the loops 60. Further, it allows for testing of samples during the flow (i.e., during movement of the reciprocating base 40). Also, the platform 10 allows for serial tests to be easily performed by removing blood after a specific test periods (e.g., every hour of operation to measure activated species). The platform 10 easily allows fresh test fluid (e.g., blood, blood products, or other agents) to be introduced and easily accommodates measurement of activated species post exposure period. The platform 10 could easily serve to test addition of anti-inflammatory agents or other pharmaceuticals in blood to measure the activation of molecular and cellular species the same of which are involve in sensitization or inflammatory reactions. The biologic test fluid is not limited to blood but could be plasma or other fluid of interest. The platform 10 can be used on the benchtop that better predicts the biocompatibility of a material (or implant, catheter, etc.) before starting animal or human testing. As discussed above the platform 10 implements a surface treatment on all the blood-contacting surfaces as a system to minimize "background noise" when testing an item in the platform.

The platform 10 of the present invention yields a system and comprehensive approach for blood compatibility of medical devices and biomaterials in that the platform 10 allows researchers as well as manufacturers to more accurately, comprehensively, and economically evaluate the biocompatibility of material substrates as well as finished medical devices in vitro. The platform data will support qualification by the FDA and may be considered as part of, or consistent with, the FDA's Medical Device Development Tools (MDDT) program initiative promoting the development of improved in vitro testing systems.

Figure 13:
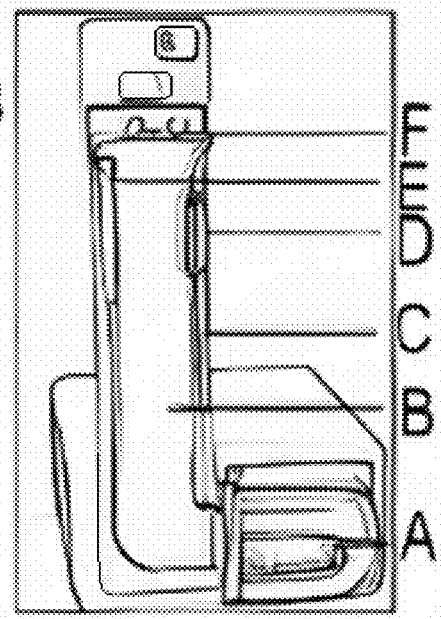
FIG. 13 is a perspective view of an alternative flow-based biological testing platform useful for comparison with the platform according to the present invention.

FIG. 13 is a perspective view of an alternative flow-based biological testing platform useful for comparison with the platform according to the present invention. This comparative flow-based biological testing platform a) a peristaltic pump such as a Watson Marlow 504Du with 502RL, b) heating element c) Tygon loop, d) compliance chamber, e) catheter/sample chamber, f) needleless ports. Hemolysis testing of the platform (RSVI platform) using bovine blood demonstrated insignificant hemolysis using flow rates equal or higher than the comparative testing platform of FIG. 13. The extremely low hemolysis of the platform 10 of the present invention is highly beneficial as is the use of smaller fluid volumes, multiple loops per blood donor, and an ability to accommodate several separate disposable test loops.

Figure 16:
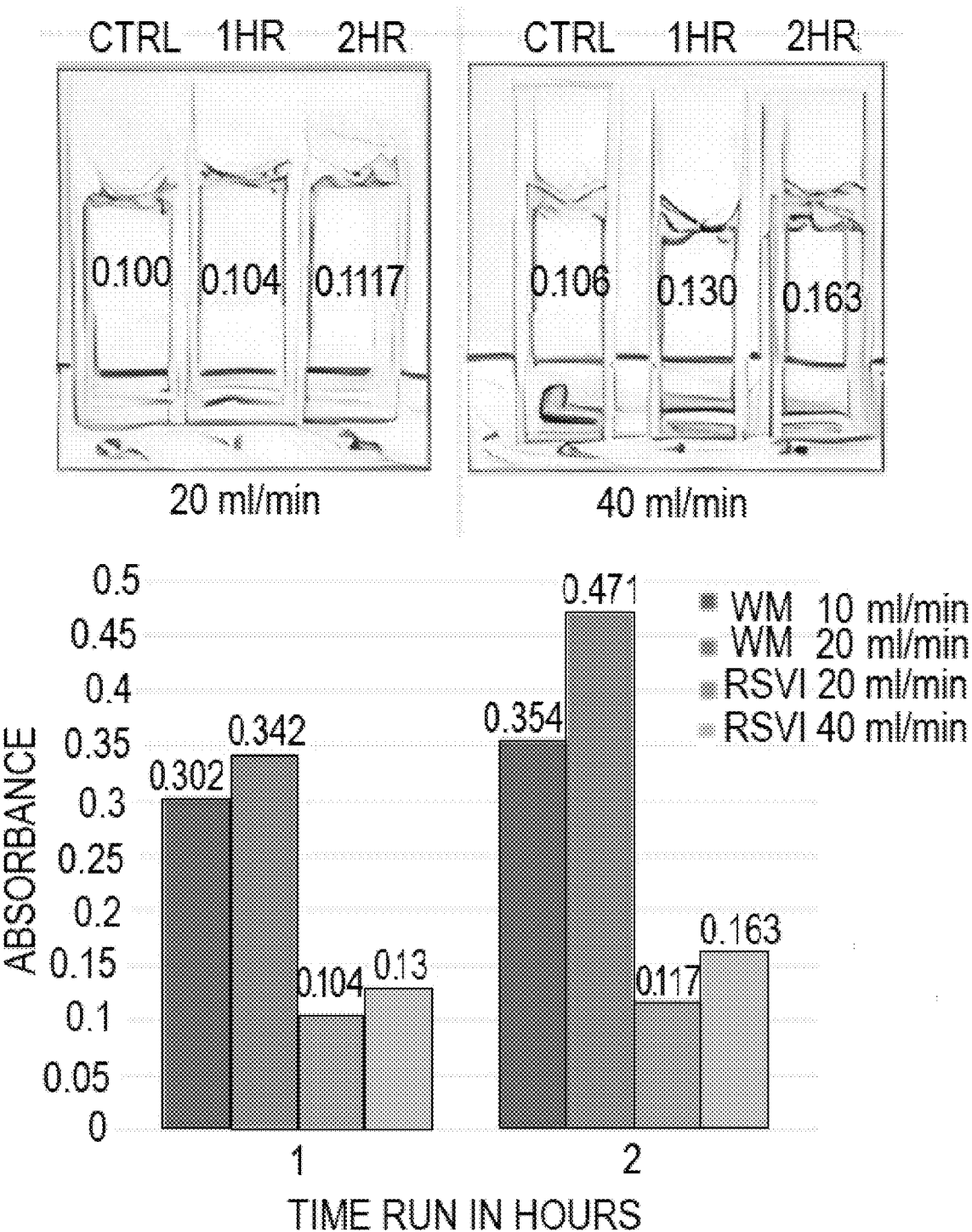
FIG. 16 shows blood plasma test results using the system of the present invention.

The test results are shown in FIG. 16. Visual appearance of blood plasma (left) after two-hour tests at 20 and 40 ml/min. These data are quantified and compared with the comparative test loop of FIG. 13 to demonstrated performance of RSVI-based system of the present invention at same test conditions. The platform 10 of the invention yields a flexible and high-throughput system.

The present invention is not limited to the representative examples discussed above but is defined by the attached claims and equivalents thereto.

What is claimed is:

1. A flow-based biological testing platform comprising:
   a stationary base;
   a reciprocating base mounted on the stationary base, configured for reciprocating motion on the base; and
   a least one flexible noncircular tubular test loop coupled to both the stationary and the reciprocating base, and wherein each test loop includes at least one check valve mounted within the test loop allowing flow in a single flow direction within the test loop, and a fluid loading and removal system attached to the stationary base allowing fluid to be supplied to and withdrawn from the flexible tubular test loop;
   wherein reciprocation of the reciprocating base induces fluid flow in a single direction within each flexible test loop.

2. The flow-based biological testing platform according to claim 1, wherein the interior of the test loop is surface treated to decrease in inflammation and coagulation characteristics of the interior of the test loop.

3. The flow-based biological testing platform according to claim 1, wherein the interior of the test loop includes a covalently bonded heparin surface.

4. The flow-based biological testing platform according to claim 1, wherein the stationary base includes a linear slide supporting the reciprocating base for linear reciprocating motion on the base.

5. The flow-based biological testing platform according to claim 4, further including a stepper motor driving the reciprocating base for linear reciprocating motion on the base.

6. The flow-based biological testing platform according to claim 1, wherein the fluid loading and removal system of each flexible tubular test loop comprises a pair of access ports separated by a tubular portion.

7. The flow-based biological testing platform according to claim 1, wherein an interior of each test loop has a bioactivity level of 0.6+/−0.2 lla deactivation/cm$^2$.

8. The flow-based biological testing platform according to claim 1, wherein each test loop includes a single check valve mounted within the test loop and wherein the check valve of each test loop is formed as a ball check valve.

9. The flow-based biological testing platform according to claim 8, wherein the ball check valve of each test loop includes a seat housing forming the seat for the valve and a chamber housing threaded thereto with a ball contained there-between.

10. The flow-based biological testing platform according to claim 1, wherein a plurality of flexible tubular test loops are coupled to both the stationary and the reciprocating base and are configured for simultaneous operation.

11. The flow-based biological testing platform according to claim 1, wherein the reciprocating base is configured for asymmetric reciprocating motion.

12. The flow-based biological testing platform according to claim 1, wherein each flexible test loop forms an oval shape in plan view and reciprocation of the reciprocating base induces pulsatile fluid flow in within each flexible test loop.

13. The flow-based biological testing platform according to claim 1, wherein each flexible test loop snaps into the stationary and the reciprocating base.

* * * * *